J. I. WOODARD.
WHEEL CLAMP.
APPLICATION FILED FEB. 17, 1917.
1,241,459.  Patented Sept. 25, 1917.
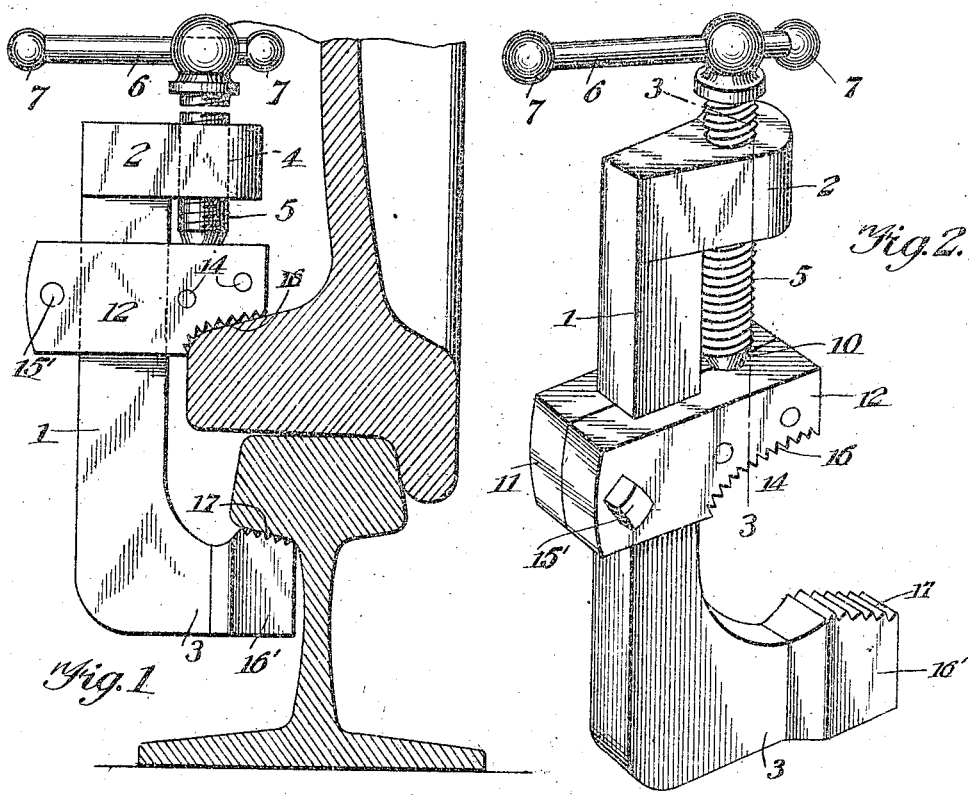
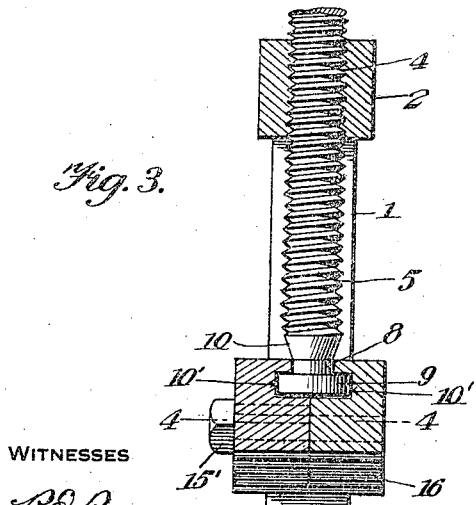
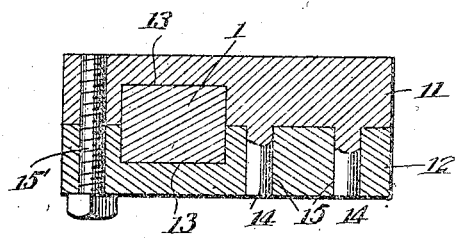
WITNESSES
R. E. Rousseau
W. J. Lovett
INVENTOR
J. I. Woodard,
BY Victor J. Evans,
ATTORNEY

UNITED STATES PATENT OFFICE.

JAMES I. WOODARD, OF WAYCROSS, GEORGIA.

WHEEL-CLAMP.

1,241,459.

Specification of Letters Patent.   Patented Sept. 25, 1917.

Application filed February 17, 1917.   Serial No. 149,308.

*To all whom it may concern:*

Be it known that I, JAMES I. WOODARD, a citizen of the United States, residing at Waycross, in the county of Ware and State of Georgia, have invented new and useful Improvements in Wheel-Clamps, of which the following is a specification.

This invention relates to improvements in means for clamping the wheel of a car or the like to a rail upon which the said wheel travels to permit of the raising of the axle and the removal of the bearing brasses for repairs, etc., and the invention resides in the construction, combination and arrangement of parts set forth in the following specification and falling within the scope of the appended claim.

In the drawing:

Figure 1 is a view illustrating the application of the improvement,

Fig. 2 is a perspective view of the improvement detached,

Fig. 3 is a sectional view approximately on the line 3—3 of Fig. 2, and

Fig. 4 is a sectional view approximately on the line 4—4 of Fig. 3.

The application of the device is illustrated in Fig. 1 of the drawings, the improvement engaging between the wheel and the underface of the ball of the rail in the usual manner to lock the wheel to the rail and it may be here stated that while the improvement is illustrated as applied to one side of the wheel the same may if desired be applied with equal efficiency to the other side or face of the said wheel.

The improvement contemplates the employment of a straight shank 1 having each end provided with lateral extensions 2 and 3 respectively, the said extensions both projecting beyond the said edge of the shank. The extension 2 preferably extends laterally over the opposite sides of the shank, as well as beyond the referred to edge of the shank, whereby the same is enlarged and widened, the same being preferably rounded in plan. The rounded enlargement 2 is centrally formed with a threaded bore 4, the threads of the said bore engaging with a screw member 5, the said screw upon the outer end thereof being formed with a head having a transverse opening through which is passed a slidable handle bar 6, the ends of the said handle being enlarged as at 7, whereby to prevent the removal of the handle from the head of the screw. The opposite end of the screw 5 is reduced to provide a rounded extension 8 which has its outer end provided with a continuous rounded flange 9 and which extension is beveled, as at 10, from its inner end to the threads of the screw. The flanged reduced extension is adapted to be received in a suitable seat or socket 10' provided upon the confronting edges of the members 11 and 12 providing the movable jaw for the device. Both of these members have their confronting edges provided with substantially rectangular depressions 13 whereby to receive the shank 1, while one of the members to the opposite sides of the socket therein within which the reduced end of the screw is swiveled is provided with outwardly extending lugs 14 that are received in openings 15 in the other member of the jaw, and the last mentioned member 11 of the jaw is provided adjacent its end opposite that receiving the lugs with a transverse threaded orifice registering with a similar orifice in the member 12 and engaging in the threads of these orifices is a screw member 15. The engaging face of the movable jaw is rounded and is provided with transverse teeth 16. The lateral extension 3 projects a suitable distance beyond the outer end of the movable jaw and is widened or otherwise enlarged to provide a jaw 16, the upper edge of the said jaw being beveled or inclined and being provided with transverse teeth 17. This jaw is adapted to underlie the head of the rail, while the engaging face of the movable jaw engages with the wheel, as illustrated in Fig. 1 of the drawings, and as the operating handle for the screw is laterally adjustable with relation to the said screw it will be noted that the same may be manipulated to move the movable jaw toward or away from the stationary jaw without inconvenience to the operator.

The device in addition to being employed for locking the wheel to the rail may be also used as a holding means for hot brasses or as a conveying means for said brasses.

From the above description, taken in connection with the accompanying drawing, simplicity of the device, as well as the advantages thereof will, it is thought, be perfectly apparent to those skilled in the art to which such invention appertains without further detailed description.

Having thus described the invention, what I claim is:

In a device for the purpose set forth, a substantially rectangular shank having its ends provided with lateral extensions projecting in the same direction, one of said extensions being widened and centrally provided with a threaded bore, a screw member engaging with the threads of the bore, a slidable handle for the screw, a reduced extension upon one end of the screw, a flange formed with the said extension, a slidable jaw upon the shank and comprising two similar members, said members having their confronting faces provided with a socket to receive the reduced extension of the sleeve, and the flange thereon, said members having their confronting edges slotted to receive the shank, studs upon one of the members, the other member having openings to receive the studs, a removable element connecting the members, said jaw having its working face rounded and provided with transverse teeth, the second mentioned extension of the shank projecting beyond the movable jaw and having its end widened to provide a jaw, said head having its working face angular and formed with transverse teeth.

In testimony whereof I affix my signature.

JAMES I. WOODARD.